(12) United States Patent
Bustelo et al.

(10) Patent No.: US 11,586,665 B2
(45) Date of Patent: *Feb. 21, 2023

(54) ART IMAGE CHARACTERIZATION AND SYSTEM TRAINING IN THE LOUPE ART PLATFORM

(71) Applicant: Loupe, Inc., Atlanta, GA (US)

(72) Inventors: Dot Bustelo, Atlanta, GA (US); Miguel Alvarado, San Francisco, CA (US); Randy Etheredge, Atlanta, GA (US)

(73) Assignee: Loupe, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/456,786

(22) Filed: Nov. 29, 2021

(65) Prior Publication Data

US 2022/0083588 A1 Mar. 17, 2022

Related U.S. Application Data

(63) Continuation of application No. 16/696,265, filed on Nov. 26, 2019, now Pat. No. 11,238,091.

(Continued)

(51) Int. Cl.
*G06F 16/55* (2019.01)
*G06F 16/583* (2019.01)
(Continued)

(52) U.S. Cl.
CPC ............ *G06F 16/55* (2019.01); *G06F 16/535* (2019.01); *G06F 16/538* (2019.01); *G06F 16/54* (2019.01);
(Continued)

(58) Field of Classification Search
None
See application file for complete search history.

(56) References Cited

U.S. PATENT DOCUMENTS 8,582,802 B2 11/2013 Clippard et al.
8,996,629 B1 3/2015 Datar et al.
(Continued)

OTHER PUBLICATIONS

Fleites, Fausto C., Enhancing Product Detection With Multicue Optimization for TV Shopping Applications, Jul. 10, 2015, IEEE Transactions on Emerging Topics in Computing, vol. 3, issue 2, pp. 161-171 (Year: 2015).
(Continued)

*Primary Examiner* — Bernard Krasnic
(74) *Attorney, Agent, or Firm* — Alston & Bird LLP

(57) ABSTRACT

The Loupe system defines Loupe Visual Art DNA for art images to be presented to a user so as to maximize and customize the user experience in viewing art images delivered onto digital displays, TVs and other screens facilitating the artwork transition with and without human interaction. The Loupe system recommendations engine utilizes both human and machine curated data to determine factors of art images that will appeal to a user viewing the images. The Loupe system gathers data about visual perception, historical and academic provenance, and emotion or intention represented in an image. The gathered data is analyzed through deep learning and AI algorithms to inform recommendations and select art images to be presented to a user. The user may purchase fine art prints or select originals of the artwork image displayed, if the artist elects to make it available for sale, presented from the Loupe integrated electronic marketplace.

18 Claims, 8 Drawing Sheets

Related U.S. Application Data

(60) Provisional application No. 62/771,364, filed on Nov. 26, 2018.

(51) Int. Cl.
*G06K 9/62* (2022.01)
*G06F 16/538* (2019.01)
*G06F 16/535* (2019.01)
*G06F 16/54* (2019.01)
*G06Q 30/0601* (2023.01)
*G06V 10/56* (2022.01)
*G06V 10/44* (2022.01)

(52) U.S. Cl.
CPC ...... *G06F 16/5838* (2019.01); *G06F 16/5862* (2019.01); *G06K 9/6256* (2013.01); *G06Q 30/0603* (2013.01); *G06Q 30/0631* (2013.01); *G06Q 30/0643* (2013.01); *G06V 10/443* (2022.01); *G06V 10/56* (2022.01)

(56) References Cited

U.S. PATENT DOCUMENTS

| | | | |
|---|---|---|---|
| 11,238,091 B2* | 2/2022 | Bustelo | G06F 16/55 |
| 2003/0234812 A1 | 12/2003 | Drucker et al. | |
| 2009/0015874 A1 | 1/2009 | Kulumani | |
| 2014/0172622 A1 | 6/2014 | Baronshin | |
| 2014/0222560 A1 | 8/2014 | Kota | |
| 2015/0142787 A1 | 5/2015 | Kimmerling | |
| 2017/0097741 A1 | 4/2017 | Liang et al. | |
| 2018/0218429 A1 | 8/2018 | Guo et al. | |
| 2019/0294702 A1 | 9/2019 | Wu et al. | |
| 2020/0142978 A1 | 5/2020 | Salokhe et al. | |
| 2020/0160064 A1 | 5/2020 | Wang et al. | |

OTHER PUBLICATIONS

Singh, D., "Searching for Visually Similar Artworks," pp. 1-11, (Sep. 2018).

Strezoski, G., "OmniArt: Multi-task Deep Learning for Artistic Data Analysis," arXiV, pp. 1-9, (Aug. 2017).

* cited by examiner

ART IMAGE CHARACTERIZATION AND SYSTEM TRAINING IN THE LOUPE ART PLATFORM

CLAIM TO PRIORITY

This application is a Continuation of U.S. application Ser. No. 16/696,265, filed on Nov. 26, 2019, titled "Art Image Characterization and System Training in the Loupe Art Platform," which claims under 35 U.S.C. § 120, the benefit of the Application 62/771,364, filed Nov. 26, 2018, titled "Loupe Art Platform with Integrated Online Marketplace Powered by the Visual Art DNA Engine" which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Historically, art display systems attempt to display art images in a catalogue fashion for a user to page through and discover art images that they may be interested in purchasing. Such systems provide little assistance to a user in winnowing down the number of art images in which they might have any interest. In such systems previous classification methods are more fixed.

Other art display systems have attempted to provide a more automated process for selecting images of interest to a user through classification of images based upon one or more factors related to each image. The classification places art imagery into categories that are human defined and are usually based upon art history, geography, and political influence. Previous implementations create a category matching system that can sometimes present art imagery to a user in which they have an interest, but along with many other items in a category in which the user has little or no interest. This more automated process is still highly dependent upon the catalogue implementation, although the catalogue presented to a user is reduced into categories that a user, hopefully, finds more interesting. In many established systems, users continue to be presented with art imagery that is of little interest but that is included in the category based upon a category key. Thus, with existing systems a user is largely required to select art imagery from many images that hold little interest to the user.

Alternatively, in currently existing art image delivery systems, a user could select an option to request all art images resident in a particular categorization and have these images delivered to them.

Although such categorization does provide for imagery a user prefers as opposed to an entire catalogue, there are undoubtedly many images in a defined category that a user would not select or in which they have little interest.

When streaming art images to a display, therefore, a user is generally required to select the images to be displayed in the streamed images. Even in systems where an automated classification technique is utilized to reduce the number of images based upon a user's expressed interests, there are often user interests that remain unexpressed and the experience is less than optimum for the user. Although a human curated system may utilize feedback from the user experience with regard to the selections preferred by each user, such systems are costly and time consuming to implement. Current automated feedback and learning systems are generally not context sensitive enough to perform at even the most minimal level that would be expected from a human curated system. Feedback and training of automated art image characterization in a current technology-based system is, therefore, not optimal.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
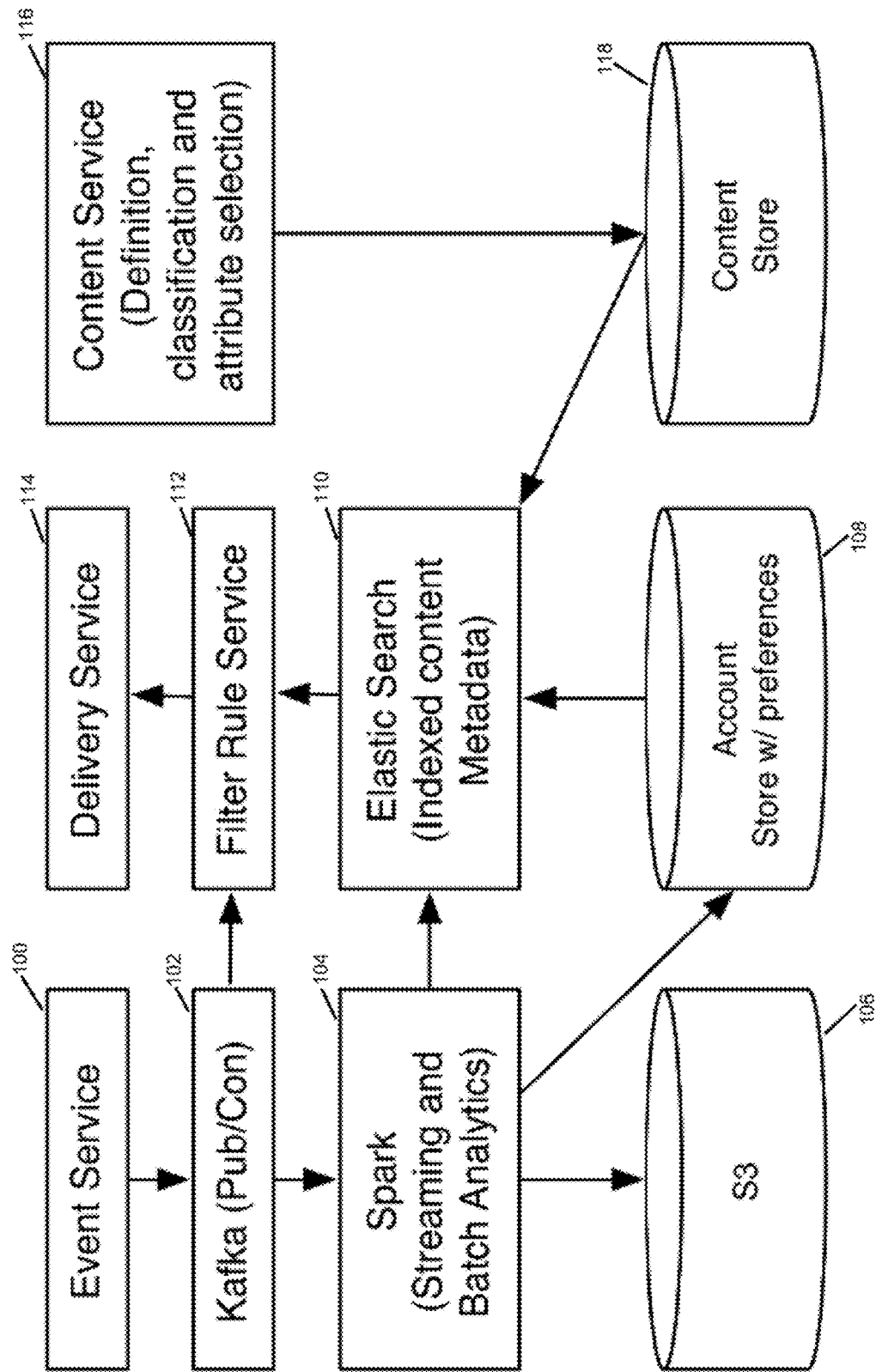
FIG. 1 is a view of the Loupe system architecture consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

In an embodiment, the use of the term "CSS" throughout this document will refer to Cascading Style Sheets, which may be used to control the appearance of the artwork presented to one or more users on a display device.

In an embodiment, the use of the term "private channel" shall refer to a channel provided to a commercial user or client that is accessed by presentation of login credentials.

In an embodiment, the use of the term "art image characterization" shall refer to the collection of characteristics that enable either a human or machine selection of art images that have greater similarity to one another than to other art images in a catalogue of art images.

In an embodiment, the use of the term "system training" refers to the feedback of human curation in training a learning system to recognize art image similarities and differences so as to enhance art image characterization for art images that are not a part of any training set or art image database used for training.

The Loupe system is designed and structured as a four-part system to deliver a personalized experience that satisfies the user's visual taste for representations of art objects, as well as to satisfy the user's taste for a continuous complementary visual experience to their streaming music service.

The first part of the system comprises a categorization of the art images to be presented using a proprietary methodology to describe the essence of the visual art images. This art image characterization provides the categorization for art images such that a learning system may collect images that are within the similarity envelope and concatenate such similar art images into a presentation stream that is suitable for a particular user, display space, hotel, performance hall, outdoor venue, or any other public display of art images.

A primary goal of the system is to be able to deliver a stream of visual art that is compatible with a user or venue's current taste in visual images. However, the visual art presented may be presented in an interactive format employing CSS transformation animations of still imagery through a proprietary art player that meets additional conditions for use and enjoyment by a user or within a particular venue. In an embodiment, the Loupe system may use a combination of CSS animation properties and JavaScript based animations to create interactive CSS animations of art images and achieve the Loupe streaming experience. Converting CSS based animations along with JavaScript based animations into webgl transformations of the art images removes any tendency for the image display to be choppy or jittery. Loupe currently uses a library to translate those animations into webgl animations that can be offloaded to the GPU. This process step improves the performance of the system and creates a fluid display of all images provided to a user.

In an alternative embodiment, the Loupe system may provide art images from streamed video in addition to the presentation of art images as CSS interactive animations of still images. In this embodiment, the Loupe system may provide the capability to discover and connect to frames within a video and capture the meta-data associated with the fine art image presented within a video stream. The capture of the meta-data would then permit the Loupe system to categorize and present to a user one or more fine art images from a video stream. Regardless of the means for presentation of art imagery, a user will have the opportunity to interact with a real time, integrated marketplace where the user may select any presented art image for purchase. Not only does the Loupe art player support individual preferences and customized recommendations but the unique desired environment of a near infinite set of public and commercial locations, that, may, even be changed with time of day, of year, holidays, seasons, etc.

The visual art may be delivered on multiple devices having a visual display capability and is presented by the Loupe system in an experience that allows the user to discover new things. An important aspect of the system is to maintain the engagement of the user with the visual display. To maintain the engagement of the user, which may also be referred to as the "stickiness" of the experience, it is essential to present to the user items that may not necessarily conform to the current tastes but may allow the user to discover new things that may be of interest and complement the desired atmosphere of the room whether in the home or workplace, as well as public or commercial display. Due to the nature of the Loupe player, the playlist combinations from the same database of images generates endless channels. For example, 2,000 art images may create as many as 180 channels of unique streams.

Additionally, the system provides a process for receiving motion art from artists. This motion art may be ingested through an established "pipeline" into the system to produce, but are not limited to, HLS streams allowing for variable bitrate consumption of the art images when transmitted to a user or venue. The variable bitrate capability permits users and venues to receive content that is tuned to the speed of the Internet connection available to maximize throughput of art images while minimizing buffering and/or wait times for the display of art images.

The Loupe system is designed and implemented to curate content and define attributes for content. The Loupe system provides a methodology to persist curation rules, as well as defines and persists attributes defined for each content item. Attributes may be categorized based on the area of focus for one or more particular attributes of the content to be curated and presented to a user. The categorization of attributes is essential in order to score the attributes based on what is important to the user. The user shall select the "things" of importance, which may then be mapped to attribute categories. In an embodiment, attribute properties are created and grouped utilizing the metadata associated with the art imagery. In a non-limiting example, the metadata used by the Loupe system may be primarily curated using the Spree content input system, although alternative content input systems may be utilized without departing from the scope of the innovative system. Such characteristics as artists, channels, medium, price, geography, marketplace availability, and moods are taxonomies assigned to the artwork imagery by the Loupe curation staff. Other metadata may be generated via algorithms implemented in the Loupe system. In a non-limiting example, the attribute "Recently added" is a very simplistic attribute in which all newly added artwork, within a predetermined time period and/or time frame such as "within the past three months", is taxoned as recently added. Subsequently, that taxon is removed once an artwork image has been in the system for a time period exceeding the predetermined time period or time frame.

In an embodiment, color taxoning is a much more complex process. The Loupe system utilizes a set of algorithms to pull the top, defined as the dominant, colors from an artwork piece by the color hex values, where each hex value represents a particular color based on the percentage of red, green and blue that defines the color. The system may then calculate a "distance" those colors are from pre-determined table of color values that represent a specific "color" category. There is a "cliff" that an artwork piece must reach to be deemed close enough to those colors to be considered, using distance filtering based on our lookup table. In a non-limiting example, if an artwork's color profile distance is too far from the predetermined palette colors, it isn't considered a member of that taxon for the artwork piece being classified, In a non-limited embodiment, the Loupe system may use the CIELAB Delta E formula to calculate a perceived distance of one color to another color. This formula differs from a Euclidean formula that only measures the distance from one color to another based upon the percentages of Red, Green, Blue (RGB) values. The CIELAB Delta E formula takes into account human color perception in its formulation such that the system may calculate the distance from one color to another color in the same manner that a human eye would perceive colors.

The Loupe system provides the ability to collect both non-realtime and active real-time data. Non-realtime data collected may consist of meta-data surrounding usage data when one or more users are interacting with the visual imagery displayed, such as user pause, replay, delete, or other functions at the direction of a user, and active content consumption data may consist of user selection, input data that defines preferences, and selection of content to purchase art objects presented. The non-realtime data is inferred from the selection of actions by the user and presents a set of inferred nonlinear data captured from the user's interaction with the visual imagery display. The non-realtime and active real-time data collection provides an ability for the system to analyze the collection of data from each user to learn more about the user in terms of interaction with the user interface, and also know about what content the user has consumed.

The Loupe system breaks down the essence of a visual art piece into a series of attributes that characterize the way that the art piece is created (as in tools and methodologies of artwork creation), and how it is perceived in digital form, as well as, the sensitivities and potentially perceived emotions from the perspective of the consumer.

Characterizing visual art piece images is built upon training a neural network through the use of a training dataset to identify images based upon an attribute taxonomy. The attributes of the images presented in the training dataset train the neural network to define and create classifications for the images. In the aggregate, the system will learn to classify images based upon the patterns present in the images and the curator definitions recorded for each image. The learning system would create a set of attributes, once again based upon definitions supplied by human curators, and ascribe the weighting of each attribute for each image. As additional training images are presented to the learner system neural network, given a set of beginning seed weight values, weighting factors are increased or decreased to arrive at a proper attribute weighting to place each image into an accurate image classification. The characterization of the art elements, through the attribute taxonomy, provide means to group items that have similarities, and therefore provide a sequence delivered as a stream of representational examples of imagery that is delightful, pleasant and natural to the senses of the consumer and subject to the location of the consumer whether in privacy of home or in public setting, and in which kind of public setting. A side effect of the sequencing is to provide a non-intrusive discoverability mechanism that can be used to sell art.

The combination of a unique and proprietary set of properties or attributes that define a piece of artwork within the Loupe system is defined as Visual Art DNA.

In an embodiment, the Visual Art DNA of art images as created by the Loupe System is a combination of attributes that when combined describe the essence of the art thus represented. Attributes utilized in this process are described later in this document. This essence can be human defined, automatically defined through a machine learning capability, or a combination of both human defined and automatically defined. The constructs that describe the essence may evolve over time in how they are defined and how they are generated.

The attributes defined for use in the Loupe system in the categorization of art are used, both together and independently, to uniquely describe each artwork's fundamental visual perception. The Loupe system utilizes a variety of algorithms to train machine learning models. These trained models may then be used to automate the value assignment of each attribute for an artwork. This value assignment has the effect of predicting the Visual Art DNA of a given artwork without the need for human intervention once the models are trained. The Visual Art DNA discovered for each art piece may then act as a reference for a particular human viewer's affinity for any subset of attributes discovered for that art piece. Utilizing a subset of the attributes the Loupe system may then uniquely weigh the importance of each attribute when scoring the overall affinity a human viewer may have for a particular piece of artwork.

In a non-limiting embodiment, the primary set of attributes defined for the Loupe system may be used in training models for use in automatic curation and categorization of art imagery through its Visual Art DNA. The primary set of attributes utilized by the Loupe system may include attributes associated with an art image physical environment, the subject and/or content, subject interpretation, location type, color/hue, light level (bright/dark), mood, music genre pairing and/or user activity, time of day, movement/motion, and mature content. These attributes provide combinations of attributes that may be used to characterize and categorize art imagery presented to the Loupe system Visual Art DNA categorization capability.

In an embodiment, the Loupe system attribute list may include an extended set of attributes for more advanced training of the Visual Art DNA. The extended set of attributes may include Art Movement Inspiration or Reference, Art Style, Art Criticism or Artist Career Point, the geo-location for the art image subject, the geo-location of the artist, seasons, palette, color scheme, perceived price, orientation, light, temperature, rhythm, texture, mass/form, predominate space, compositional arrangement, and focus/depth of field and are further defined in a later section of this document. The extended set of attributes may be utilized in combination with the primary set of attributes or as a separate set of attributes to provide expanded training capabilities for the Loupe system Visual Art DNA creation.

The weight of each attribute of the set of attributes is established for each user and venue to which art imagery is streamed. This weighting evolves for each user and for each venue into which art imagery is streamed and for which the Loupe system receives feedback based upon how users and users in venues interact with the art images being streamed to the user or venue. The interaction with users, either individuals or in particular venues, provide information on the attributes that are important to the users. The Loupe system may modify the weight of each attribute to better align the content being server with the users or venues consuming the art imagery from the Loupe system. In a non-limiting example, if User A tends to engage with art image content based upon their mood during the streaming experience, but User B engages more with content that is based upon music being played at the same time as art imagery is presented, the attributes may be modified by the Loupe system to reflect these preferences for the different users. Over time the Loupe system may continue to calculate the weight that each attribute has for each user and each venue that consumes art imagery delivered by the Loupe system. Additionally, the Loupe system may aggregate weighting for users with identified similarities, and for venues having identified similarities, such as Users preferring particular color palettes, or venues serving particular similar clientele. These weighting parameters may, over time, become better tuned to provide a more customized experience to each user or for each venue engaging with the Loupe system.

The neural network thus creates the weighting of attributes that inform the placement of each image into a particular classification. This training dataset provides the system with verifiable examples of what images belong in a particular classification and what images do not belong in a particular classification.

At the completion of the training phase, the learner system will provide a classification for new images presented to the system from a test image dataset. The test image dataset is composed of images that have known classifications, but are unknown to the learner system. This test image dataset is used to validate the fact that the learner system has successfully learned from the training image dataset how to classify unknown images.

In relation to labeling the artwork with the attributes of the Visual Art DNA, the Loupe system may have the ability to know about content consumed by each user as well as emotive responses to the content by other professional crowd-sourcing communities that specialize in this sort of task for reliable and trustworthy assignment of attributes. In a non-limiting example, the crowd-sourcing identification may be performed by a company such as Figure-Eight (www.figure-eight.com). This process is commonly referred to as tagging and labelling of data. The content consumption data and operation rules permit the Loupe system to avoid repetition within a defined period, whether that period is defined as a session, a particular time period, or even a particular location that is associated with a session or time period. It is critical to be able to collect data around the content already viewed by a user within a defined period and/or location so that the content and sequence of content is not sent twice to the user during the defined period and/or location.

The second portion of the Loupe system, comprises the publishing portion of the system. This portion of the system controls content management providing all of the tools to manage individual assets, populate Visual DNA attributes, such as tags, managing publishing dates, times, and categorization, and making assets public and available to users through the Loupe publishing capability. The publishing portion of the system utilizes the Visual Art DNA process to describe the digitally perceived essence of an art piece. The Loupe system will also have categories for the sake of manually curating groups of art pieces. The categories, however, will be driven as much from an experience perspective, rather than solely intellectual, academic and historical components of an art piece. The Loupe system will present a combination of categories and attributes definitions. As a user experiences art works delivered to their attention through a Loupe art player, the Loupe system gathers inferred nonlinear and active data from the user to form the basis for processing by a recommendations engine to provide users with art works they may wish to view, combine into a playlist, or acquire. The recommendations engine will be based on learner systems that will group images based on their fundamental characteristics, as well as incorporating the user's taste and preferences.

A favoriting system may be created that utilizes specific user history data to create a list of favorites for each specific user. The user history data, composed of what images a user has navigated to, captured, selected, and/or purchased, informs the user image preferences based upon the classifications established by the learner system during the training phase.

In an embodiment, the favoriting system begins with the identification of each user as the user logs into the Loupe system. As each user selects artwork pieces and designates the selected artwork pieces as favorites, the Loupe system adds the selected artwork pieces to a map which assigns favorited artwork to each user. The Loupe system can then create and present to a user a channel of only their favorites by using this map.

The mapping is done using a database table which lists a user id and product id so that they are able to be retrieved together.

The third part of the system comprises all interaction between a user and the publishing system implemented within the Loupe system to form the Loupe Streaming runtime portion of the system. In this portion of the system, utilizing categories and other information from the publishing portion of the system to feed the Loupe Streaming runtime. The Loupe Streaming runtime consumes functionality from a recommender sub-system to provide a sticky personalized experience.

The Loupe Streaming runtime portion of the system collects data from each user to know what presented content each user liked and didn't like and to what degree it was liked, and other types of active user interaction with the presented content over a period of a session, day, week or other time duration. Feedback from each user on likes and dislikes with regard to the art presented may enhance the predictive models for what art to present based upon the stated preferences and the inferred nonlinear and active data collected from each user. It is critical to the performance of the predictive model and the performance of the Loupe system to understand what content each user has liked and what content each user has not liked.

The Loupe system may define one or more standard or starter user profiles where these standard or starter user profiles may be prepopulated with one or more initial attributes collected from the user during signup with the Loupe system. In order to prevent a "cold start," which would prevent the efficient operation of the predictive models utilized within the Loupe system, it is essential to collect some preliminary data from the user when the user signs up. This initial data collection provides some initial data upon which the predictive models may function.

The art images selected for presentation to a user may be presented as a series of still images that are properly formatted for each display screen that the user has designated as a destination display for the images to be presented. The Loupe Art Player may slowly pan each delivered image across the display on which the image(s) are presented. In a non-limiting example, the speed of the pan depends upon how closely the aspect ratio of each art image matches that of the source device or screen display. The delivered images are presented as a stream of still images so as to provide the user with the ability to select any of the delivered images for later purchase through an integrated electronic marketplace. Additionally, the Loupe Art Player may stream images other than still images, such as motion art as display in formats such as, in a non-limiting example, animated art presented in motion capable GI F (Graphic Interchange Format) images.

In an embodiment, the Loupe system contains a Loupe Web Streaming Player as well as other device specific apps such as but not limited to Apple TV app, Amazon Fire app, an Android app, etc. The Web Streaming player is implemented such that the content may be transmitted to and played on a screen associated with any network capable device. This implementation provides the content from the Loupe Web Streaming Player for display on large format screens, independent displays, computer displays, video walls, projected digital murals, mobile device displays, web capable displays, smart phone displays, tablets, and even smart watch displays and via Content Management Systems (CMS) software to control multiple devices simultaneously. Smart watch displays and any products developed by digital display and digital signage companies—or any such display capable products.

In an embodiment, the Loupe system also contains a Loupe player providing the capability to present content to a variety of proprietary LED displays, such as but not limited to displays implemented for all screen formats for mobile devices and other LED displays.

The Loupe system presents a user with access to an e-commerce marketplace where a user may purchase fine art reproductions and originals of art images presented to the user through the Loupe Art Player, The electronic marketplace will be enabled to capture the identification of the art image or image(s) in which the user has expressed interest, providing the user with options for format, size, and delivery of the purchased art image(s) as a fine art print or in select cases the original, physical artwork itself in real time, The Loupe system provides delivery of content that explores the potential and fascinating interplay of music and art attributes of the displayed content. The Loupe Art Player, in any configuration, is conducive to use with music players, such as, in non-limiting examples, Spotify, Apple Music, and Pandora.

The Loupe system also provides the capability for private channels to be created and provisioned when a user acquires a commercial license. The Loupe system can send a unique stream of art to a business location that has paid for a license, such as hotels, airports, sports venues, conference centers, casinos, restaurants, business lobbies and common areas, and other commercial spaces. The offering by the Loupe system is an art programming service provided to those commercial users wishing to provide visual art displays to large groups of individuals utilizing the commercial space. The private channel option permits the Loupe system to provide, and continually refresh, a collection of art that speaks to a commercial user's unique art identity.

The Loupe system allows for an integrated marketplace for each image provided by the system to those who may have seen an art image displayed in a public place, such as a commercial space or business. In the integrated marketplace, a user may log into the Loupe system and interact with each image to purchase, save for purchase, and otherwise interact with imagery selected by the user. The imagery interaction in the integrated marketplace managed by the Loupe system allows for an integrated marketplace in real time.

The fourth portion of the Loupe system provides a framework for predictive modeling utilizing machine learning. Recommendation engines are typically powered by predictive models, composed by items having one or more attribute definitions, collaborative filtering and machine learning algorithms. It is essential to have a framework to run the models as well as test the models before putting them in production. The system may have the ability to run the models in batch fashion, but may also be able to filter the results in real-time by utilizing a user's real-time behavior.

In an embodiment, before recommendations can be executed and provided to a user, metadata for the content must be provided or created so that proper content can be selected as one or more recommendations for a user. For recommendations to be effective, they can't be selected as a 100% result driven from machine decisions. Effective recommendations require some sort of human interaction to define the characteristics of the content. Attribute definition for the content database is the first step in discovering and creating metadata to be associated with each item of content. Initial categories for the attributes to be defined include:

1. Medium Fundamentals. Depending on the content type (i.e.: photo, painting, video), the medium fundamentals will be different, but these are fundamental characteristics that differentiate, for example, the content type, (i.e.: light, motion, etc.) from all other representations of that content type. Specialists in each specific media may provide input as to the list of attributes for each content type.

2. Composition and Context. This is related to the composition and context, in other words, a Studio photo, Outdoors photo, Landscape photo, or other location or background will assist in defining the attributes.

3. Lifestyle/Activity. This is how the piece of art will provide an optimum experiential atmosphere to complement the viewer's activity, i.e. child's birthday party, rock concert venue, romantic date, elegant dinner party, edgy downtown party, style of music being consumed, etc.

4. Time Period and Geolocation. This is how the Loupe system may determine time and physical location of both the Loupe artist and the Loupe viewer/user.

5. Subject/Content. This is how the Loupe system determines the primary content of the art image and may feature portrait, still life, nature, animals, nudes, landscape, abstract, people (multiple), cultural appropriation, architecture, sports, transportation, music instruments, outer space, food, fashion, children, and other subjects to be defined.

6. Medium. This is how the Loupe system determines the materials used to capture the image and may include oil painting, acrylic painting, photo, illustration, pencil, watercolor, video, mixed media, animation, digital art, cinemagraph, sculpture, assemblage, collage, encaustic, etching, screen printing, intaglio, gouache, mural, and/or installation.

7. Art Movement Inspiration. This attribute determines how the Loupe system captures the era or movement for each art image and may include Renaissance, Baroque, Rococo, Romanticism, Realism, Impressionism, Fauvism, Expressionism, Cubism, Futurism, Abstract Expressionism, Dada, Surrealism, Art Deco, Pop Art, Conceptual Art, Land Art, Minimalism, Light and Space, Neo-Dada, and Feminist.

8. Art Style. This attribute determines how the Loupe system captures the style of each art image and may include Realism, Representational, Impressionism, Street Art, Modern, Fine Art, Dada, Urban, Abstract, Documentary, Surrealism, Nonobjective, and Narrative (tells story).

9. Art Criticism or Artist Career. This attribute determines the career progression of an Artist and may include Emerging, Mid-career, Represented, Blue Chip, Established, Masterpiece, Avant-garde, and Iconic.

10. Mood. This attribute determines how the Loupe system may capture the mood of an art image and include Optimistic, Inspiring, Relaxing, Energizing, Party, Melancholy, Dark, Angry, Sexy, Shocking, Humor, Dramatic, Romantic, Happy, Sad, Frightening, and Introspective.

11. Subject Interpretation. This attribute determines how the Loupe system determines an interpreted categorization of the elements in an art image and may include Death, Love, Environmental Activism, Feminist, Family, Friendship, and Futuristic.

12. Music Genre Pairing. This attribute determines a musical style that is most associated with the art image being displayed and may include Classical, Jazz, Electronic Dance, R&B, Ethnic/World, Blues, Rap, Rock Country, Music Theater/Opera (no subgenres).

13. User Activity. This attribute expresses the action or activity expressed within the art image and may include Party, Workplace, Relaxation, Romance, Exercise, Medical/Health, Music Listening, Waiting Areas, Drug action.

14. Geo-Location: Art Subject. This attribute expresses the geographical locale expressed within an art image and may include Asia, North America, South America, Europe Caribbean, Africa and other geographic locations.

15. Geo-Location: Artist. This attribute expresses the geographical locale for the artist who created an art image and may include Asia, North America, South America, Europe Caribbean, Africa and other geographic locations.

16. Physical Environment. This attribute expresses the physical milieu captured within an art image and may include Parks, Forest, Countryside, Ocean, City, Mountains, outer Space, and Ambiguous Space.

17. Location Type. This attribute expresses whether the art image is set in an Interior or an Exterior space.

18. Time of Day. This attribute expresses the portion of the day in which the art image is set and may include Sunset, Sunrise, Night, Daylight or other defined dayparts.

19. Seasons. This attribute expresses whether the art image is set in Spring, Fall, Summer, or Winter.

20. Color/Hue. This attribute expresses the main color into which the art image is to be categorized and may include Blue, Red, Yellow, Green, Brown, black, White, Teal, Pink, Orange, Grey, Purple or other defined base colors.

21. Palette. This attribute expresses the primary group of colors into which the art image is to be categorized and may include Earthy, Rustic, Neon, Black and White, Sepia tone, Neutral, Subtle, Monochromatic, Metallic, Bold, Industrial, Pastels, Warm Tones, Cool Tones or other defined color groupings.

22. Color Scheme. This attribute expresses the overall color composition and may consist of Tertiary, Complementary, Analogous Colors, as well as other defined color schemes.

23. Perceived Price. This attribute expresses a dollar value for the art image.

24. Orientation. This attribute expresses how the art image is best viewed and may consist of Portrait, Landscape, or Square values.

25. Light. This attribute expresses whether the lighting in the art image is Darker or Brighter, harder or softer and may be rated on a sliding relative lighting scale.

26. Temperature. This attribute expresses the subjective feeling of warmth within an art image and may be expressed on a sliding scale of Warm (yellow/red/sun/fire) versus Cool (blue/Snow/Icy), or Saturation.

27. Motion/Movement. This attribute expresses the activity within an art image and may be defined as High Activity, Static, Repetition or other defined activity values.

28. Rhythm. This attribute expresses whether the art image contains Repeating Objects versus Singular objects.

29. Texture. This attribute expresses the perceived texture of the art image and may consist of Smooth, Raw, Rough, Liquid, Grainy, Reflective, Painterly or other defined textures.

30. Mass/Form. This attribute expresses whether the art image contains large objects or small objects.

31. Focus/Depth of Field. This attribute expresses the visual sharpness of the art image and may be represented as Blurry, In-Focus, Partial Focus, Foreground, or Background.

32. Predominant Space. This attribute expresses whether the art image is represented as a positive or negative space.

33. Compositional Arrangement. This attribute expresses how the elements of the art image are arranged within the image and may be represented as Balanced, Unity, Asymmetrical, Diptych, Triptych, and/or Repetition.

In an embodiment, once categories of attributes have been established, the process for defining attributes of the content is created. One of the characteristics of the product is that content will be humanly curated by visual artists and related professionals as well as by power users of the platform. Part of the curation process is also defining the attributes for all content elements to create an attribute taxonomy. The emotion category is subjective, so the following steps should be followed for the emotion category:

A) Capture the profile/tastes of each one of the curators, using the same attributes as users.

B) For every element, get the emotion from each one of the curators.

C) Persist the emotions categorized by profile type.

Human curators and/or professional crowd sourcing may be used to create the training set of images that populate the training image dataset. A small set of images may be provided to a set of human curators, using the defined attribute taxonomy for classification, to place the images in the appropriate classifications. These human curated classifications are associated with the images as metadata and the training image dataset is created.

Once attributes are available to the Loupe predictive modeling module, the predictive models and filters should be able to decipher the next piece of content that the user will enjoy.

Machine learning, for example, provides tools and techniques such as Clustering, Collaborative Filtering, Matrix Factorization, and Neural Nets, that can be applied to define and establish the relative weighting needed for the neighborhood models.

The following techniques may be used to implement the models as part of the Machine Learning capability:

A) Clustering. This technique is used for machine generated clusters of items. These will change automatically over time, and new clusters (segments) may arise.

B) Collaborative Filtering. This technique is used to find similarities between items and between people.

C) Neighborhood Models. It's a type of model used for the filtering. These models use a weighted average to predict the ratings of an item, based on previous ratings.

D) Matrix Factorization. This is used for inferred nonlinear factors, effectively an optimization.

E) Neural Networks. Neural Network techniques can be applied for the machine learning aspects.

Upon collection and categorization of all incoming data, the models will run periodically and the end result is:

A) Clusters of items.

B) Based on similarities, come up with a table of item classification for items that the user may want to see. This table can be persisted in ES by user.

C) The weights for the collaborative filtering.

In an embodiment, when the "next piece of content" is requested, the content is fetched based on the model results. There is, however, a set of filtering rules that kick in to make sure that content is not repeated, and also keeps into consideration the user's latest ratings. In fostering the analysis and filtering for retrieving the "next piece of content" the user must rate content so that the rating become input for the learning algorithms. One of the challenges is to expose the ratings capabilities in a non-intrusive way that also gives the user an incentive to provide them.

Basic requirements to implement the Loupe web application may include:

A) A Device that is HTML5+JavaScript compliant, and supports hardware accelerated rendering.

B) The Loupe system relies on CSS transformation animations of still imagery and relies on the proprietary Loupe web player as well as artwork specifically submitted to Loupe as motion art, with the art player's capability to also stream any channel as "fixed" video files.

C) The Loupe system Web Streaming Player provides support for all screen aspect ratios.

D) The Loupe display capability is mobile responsive—While there is no minimum screen size, the web application will scale its UI down as it approaches 768px wide Primarily noticeable on the home screen whereby the number of channels across per row decreases as screen size is reduced, down to one column of single channels visible on an iPhone screen.

E) In a non-limiting example, the dimensions for a static image to be presented on a display associated with a smart TV device, which has a 16×9 fixed aspect ratio, is approximately 1800×1013 pixels.

Turning now to FIG. 1, this figure presents a view of the Loupe system architecture consistent with certain embodiments of the present invention. In an exemplary embodiment, the diagram presents a view of the high-level architecture components. The approach is to go with traditional services architecture, along with key value stores for long term storage and for overall data persistence.

In an embodiment, the following is the description of potential components that may comprise the Loupe system. However, this set of potential components may in no way be considered limiting as additional or substitute components may be utilized in place of any component in this description.

The Loupe system may have an Event Service 100 that is responsible for collecting events in real-time fashion from the front-end application(s). The Event Service 100 continuously collects events related to user behavior and content consumption as an active, dynamic data capture service.

The Event Service 100 may transmit captured data to an open source, high throughput message bus with a publisher consumer model that supports n number of producers and n number of consumers 102. In a non-limiting example, the Kafka service is one such service that may be incorporated within the Loupe system, however, this should in no way be considered limiting as other services may provide the same capability without impacting the innovation described herein. This high throughput message bus 102 will be used to pass events around throughout multiple services. At the beginning, the number of producers and consumers will be rather limited, but the producers and consumers will continue to increase as the Loupe system continues to operate.

The open source, high throughput message bus 102 may transmit data to another open source system, used for batch analysis of data, and also data stream processing at 104. This batch analysis and data streaming capability 104 may be implemented by incorporating the Spark open-source system in a non-limiting example. The real-time data analysis may be performed by the Spark system, as well as the operation of the predictive models utilized within the Loupe system. In a non-limiting embodiment, the Spark open-source system includes MLib which contains implementations of various machine learning algorithms. The Spark system may also come with a graph analysis library that may be implemented in future releases of the Loupe system.

Data captured by the Event Service 100 may be stored within a data file storage system 106, such as the S3 data store released by Amazon Web Services (AWS). The data file storage system 106 may be used for long term archival and storage of collected raw data.

Additionally, both raw data and data about users may be stored in an electronic data file storage system known as the Account Store 108. The Account Store may hold metadata about user that includes user configuration information and preferences information in terms of attributes representing the user's taste in art imagery.

The Loupe system may provide an Elastic Search component 110 implemented as a service that may be used to index user and content data for the sake of scalable and low latency search for desired art imagery. Additionally, the Elastic Search may store user recommendations and preferences, as well as the content metadata and attributes as received from the Spark component 104. The Elastic Search 110 data store permits all collected data associated with one or more users or venues to be readily searchable and be retrieved in a low latency fashion. The Elastic Search 110 may store the results from running the predictive model, so at any point in time the Elastic Search 110 can return recommended lists of art imagery viewed for a given user.

The Loupe system provides a Filter Rule Service 112 to filter art imagery based on the most recent actions of a user which may not have been considered on the most recent run of the predictive models. In normal operation, the predictive models are run once a day to update all user parameters and input the most recent data for each user. Additional factors that may affect the filtering rules in future updates of the Loupe system may include special event for a selected genre or other events configured for the Filter Rule Service 112. The Filter Rule Service 112 may receive real time events from the Kafka service 102 to provide for real time updates of the user's profile.

The Loupe system provides art imagery streamed to users and venues through a Delivery Service 114. The Delivery Service 114 connects to a client application that is initiated and used by a user or venue to deliver instructions on what art image content should be streamed to the user or venue and in what order. As each art image is displayed, the Delivery Service 114 provides instructions to the application on what art image should be displayed next.

The Loupe system staff interacts with a Content Service 116 to ingest content, define the content attributes, create genres, classify the content based on genres, and create attribute categories. The Content Store 118 is the electronic data store that receives definition, classification, and attribute selection metadata from the Content Service 116 to provide the art imagery to users and venues.

In an embodiment, the Content Service 116 and Delivery Service 114 combine to select, prepare, and deliver art content that is specific to a user based upon inferred non-linear and active content selection and viewing by the user, or requested by a user in a defined playlist.

Figure 2:
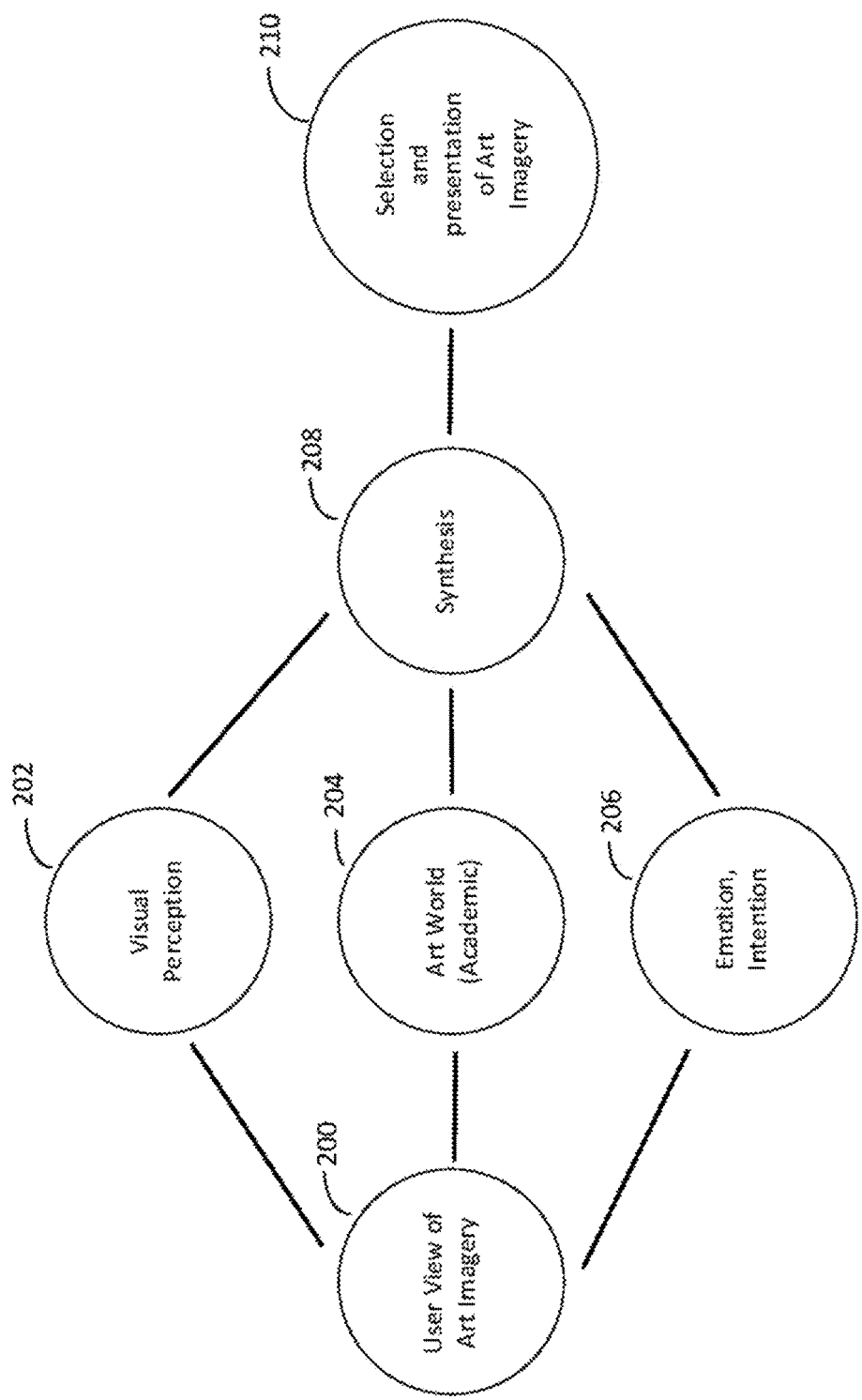
FIG. 2 is a view of the Loupe system content identification process consistent with certain embodiments of the present invention.

Turning now to FIG. 2, this figure presents a view of the Loupe system Visual Art DNA content identification process consistent with certain embodiments of the present invention. In an exemplary embodiment, the system presents a process for creating Visual Art DNA as an identifier for curated, customized and personalized for a user. The process begins by interacting with a user to first select one or more visual art representations that are preferred by the user. The art work(s) selected are analyzed for visual perception and awareness of the visual components of the art work(s), information about the art work(s) from academia, historical records, and artistic techniques, and emotion and/or intention established for the art work(s). The emotion or intention aspect of the art work(s) may be crowd sourced from multiple human sources.

The Loupe system then synthesizes the essence of each art work and decomposes the essence through a custom algorithm into multiple categories of attributes, creating attribute lists for each artwork. 20

The art work attributes are encoded into a machine-readable format to provide for indexing in a computerized system. The computerized system encodes the art work for classification, co-relation to other art work(s), and creates an index for each art work. The Loupe system also incorporates valuation and information from human curators to provide both computerized and human information to a recommendations engine that may then select and present art work(s) to a user based upon the created Visual DNA for each art work, where the Visual DNA provides for the selection of art work(s) that are more strongly associated with the preferences and interests of the user.

Additionally, the Loupe system provides a subset of attribute tags that are connected to artwork that are still images. The attribute tags may then be used by the learning system to create one or more trained models for autonomously identifying these art images. The process of training the learning system to utilize the attribute tags allows for a human curator to provide information and insight where the automated system cannot definitively categorize an art image. The data from this process, what art images were not categorized properly on the first pass and the insight provided by a human curator to cure the image classification, may be used by the system to continue the evolution of the trained models utilized for automatic classification of art images.

Figure 3:
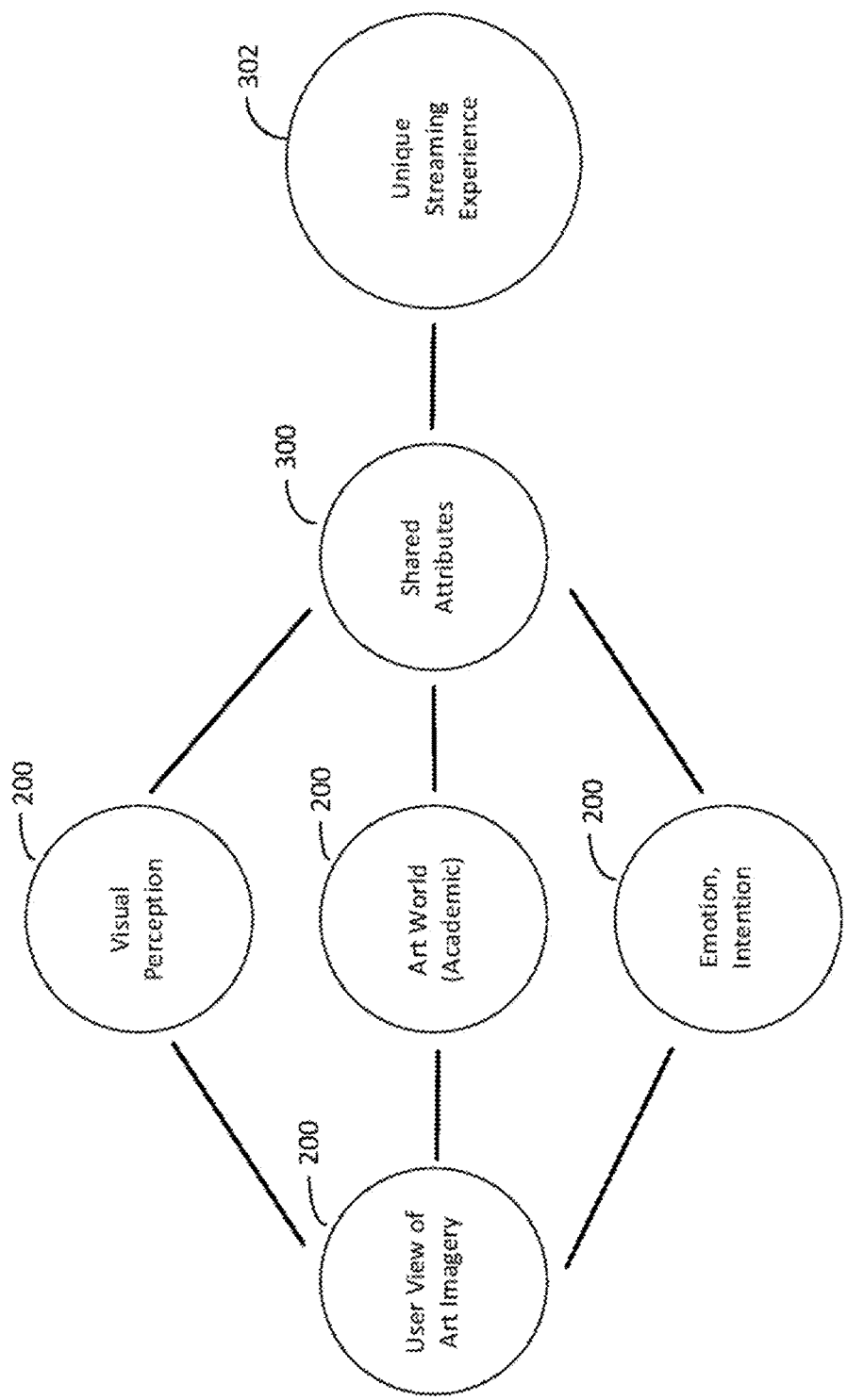
FIG. 3 is a view of the Loupe system player control consistent with certain embodiments of the present invention.

Turning now to FIG. 3, this figure presents a view of the Loupe system player control consistent with certain embodiments of the present invention. In an exemplary embodiment, a Loupe system player will provide a continuous and full screen immersive stream of still images of art or motion art (i.e. computer-generated animations, video art, etc.)—to a user based upon the discovered recommendations for a user. The Loupe system utilizes both machine learning and Artificial Intelligence (AI) techniques to enhance the decision of what art images to present to a user in combination with visual perception, academic and historical aspects, and the discovery of human curated emotion and intention aspects of art images. This combination of techniques and attributes provides a unique continuous and uninterrupted streamed presentation of art images that are more precisely tailored to a user's concise preferences in art imagery. Upon presentation, the Loupe system may maintain a log of imagery presented on a per user basis to more efficiently integrate with an integrated electronic marketplace where a user may purchase an art image(s) desired.

Figure 4:
FIG. 4 is a view of the Loupe system home page consistent with certain embodiments of the present invention.

Turning now to FIG. 4, this figure presents a view of the Loupe system home page consistent with certain embodiments of the present invention. In an exemplary embodiment, the Loupe system home page presents a user with a selection of images and quality of imagery that may be accessed in the Loupe experience. These cover images displayed represent the theme and content direction of the curated collection within that channel and are regularly updated to remind the user that the channel content itself is regularly updated. The Loupe system home page provides the user with access to a menu of options or customization of the streams, whether filters to remove certain imagery or alternate home screens that display the Loupe art catalogue in a different type of configuration of channels, i.e. to stream by color, to stream by artist etc., to provide access to the electronic marketplace powered by the Loupe system, a login option for members and returning users who have registered with the site, and information about Loupe and the services provided.

Figure 5:
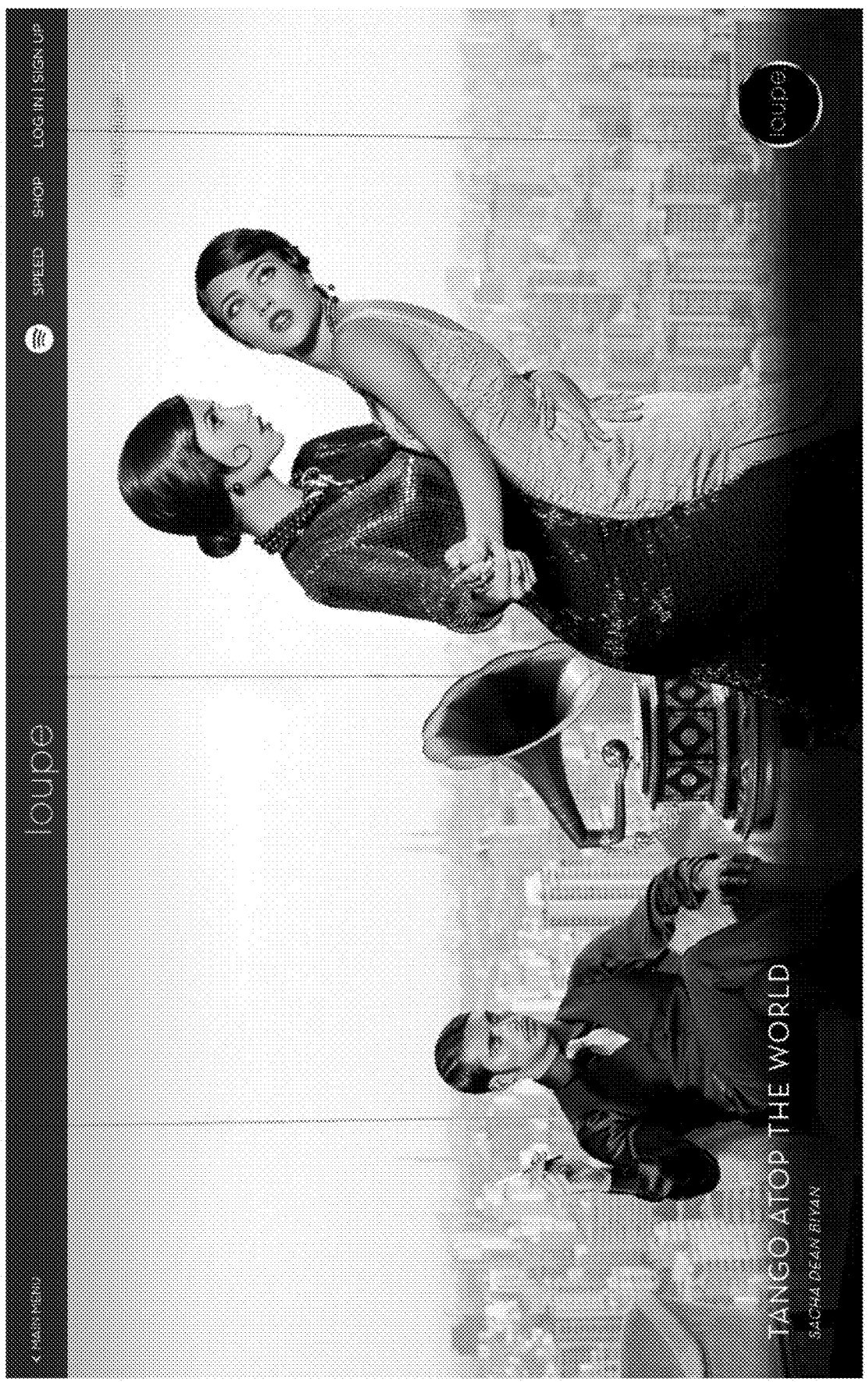
FIG. 5 is a view of the Loupe system content presentation consistent with certain embodiments of the present invention.

Turning now to FIG. 5, this figure presents a view of the Loupe system content presentation consistent with certain embodiments of the present invention. This figure presents a non-limiting example of a visual art image that could be selected and presented to a user. The visual art image may be a transformation animation of a still image, an animated file type, an image captured from a video stream, or any art display image with which the Loupe system may provide an interaction capability within the real time marketplace. The image is formatted for the display identified by a user for delivery of the imagery. Although not shown, the image presented to a user may pan from left to right and/or top to bottom of a display screen so as to present the art image in the proper quality and resolution.

Figure 6:
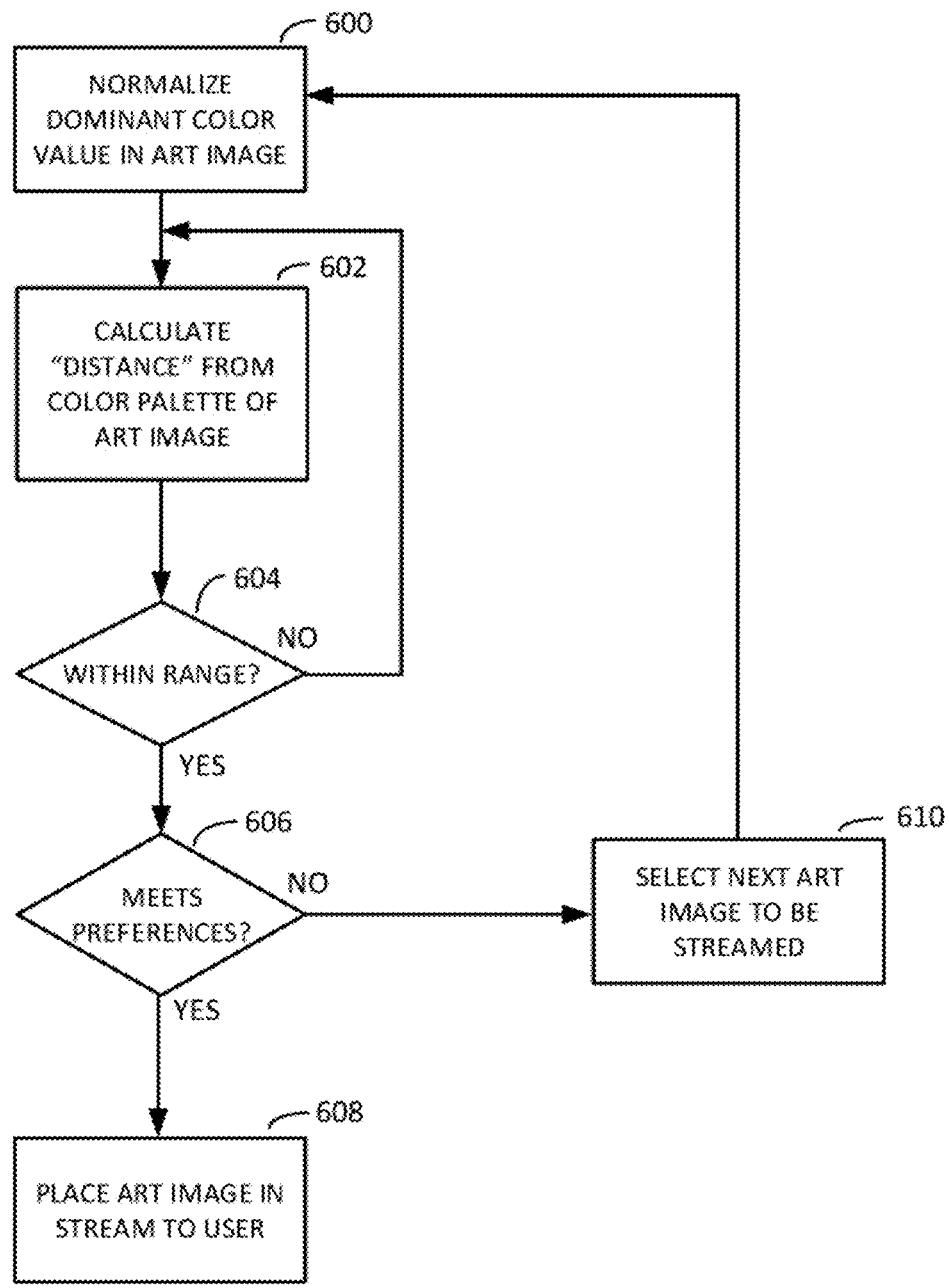
FIG. 6 is a view of the Loupe system stream by color capability display consistent with certain embodiments of the present invention.

Turning now to FIG. 6, this figure presents a view of a Stream by Color operation consistent with certain embodiments of the present invention. In this embodiment, the Loupe system Art Player utilizes an algorithm that normalizes the dominant color value in an image 600, then calculates the normalized color's distance from a custom table of color values to ultimately map the normalized color to the closest color "bucket" within a pre-defined color range. The distance filtering is based upon a custom color lookup table established in associated with the algorithm utilized.

In an embodiment, the Loupe system calculates the distance from all colors defined in a palette 602 and categorizes each color as belonging within a particular color palette if the primary color perceived is within a score of 0.5 of that primary color 604. Colors with a score greater than 0.5 away from the primary color of that particular palette are not included within the particular palette as being "too far" away from the primary color of the particular palette 608 and are not included in the art image data stream being presented. The system may then add the human eye perception/curation to the categorization process to confirm that an art image to be classified feels like the art image belongs in a particular color stream 606. This confirmation creates a cohesive and logical progression of experience and mood as art images are presented to a user or within a venue 608. After including or discarding a selected art image from the art image stream, the next art image is selected at 610 and similarly evaluated for inclusion or deselection.

The Stream by Color operation takes advantage of a set of customized algorithms and identifying taxons to permit the selection of images to be presented to each user based upon his/her preferences as captured and analyzed by the Loupe system. The operation may utilize information concerning the emotion or intent of art images in the curation process, however, the images presented may be selected automatically without further human curation. This operation creates an effective stream by color experience that is a fluid representation of color associated art pieces presented to the user.

Figure 7:
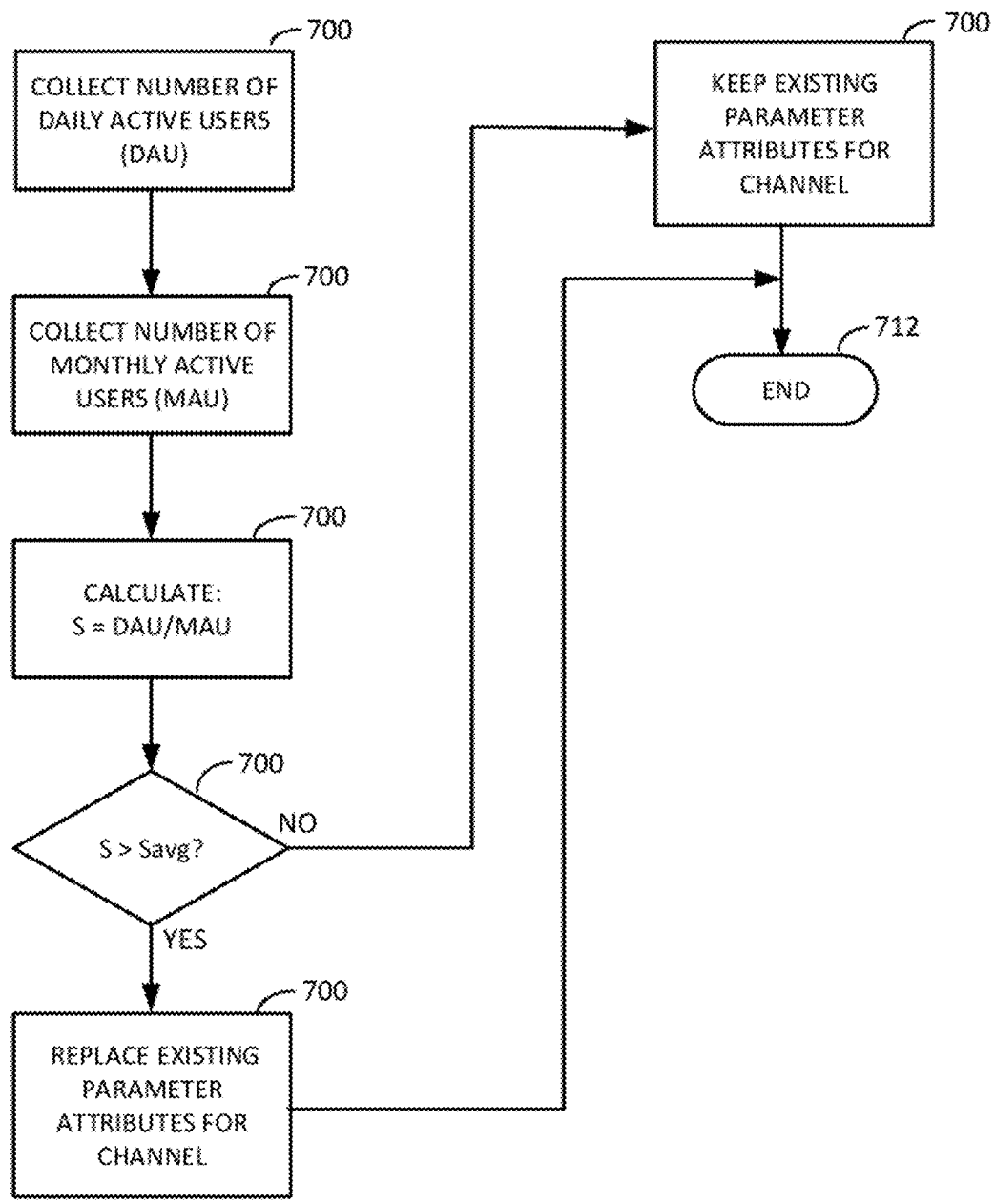
FIG. 7 is a view of the Loupe system user behavior verification consistent with certain embodiments of the present invention.

Turning now to FIG. 7, this figure presents a view of the Loupe system user behavior verification consistent with certain embodiments of the present invention. In this embodiment, the user interaction with the Loupe system through the use of Visual Art DNA is maximized by the understanding of emotional and stress responses in humans. Understanding these factors and incorporating the factors that increase relaxation into the recommendations engine of the Loupe system, also increases the amount of time the average user continues to stream art images selected through the use of Visual Art DNA and displayed via the Loupe Art Player. Reducing stress and increasing the feeling of relaxation in a user leads to an average viewing time, or "stickiness", of over 2.5 hours per viewing session.

In an embodiment, the Loupe system may collect the number of Daily Active Users (DAU) 700 and the number of Monthly Active Users (MAU) 702. The determination of "stickiness" with regard to an art image viewing experience may be calculated by dividing the number of DAU by the number of MAU to arrive at a percentage value for the stickiness parameter. The stickiness value may be presented as: S=DAU/MAU and is expressed as a percentage 704. A higher percentage value equates to a higher number of users returning to the Loupe system streaming view of art imagery.

Thus, in this non-limiting example, the higher the percentage value, the greater the stickiness value for a particular stream of art imagery. The closer the DAU value is to the MAU value, the greater the stickiness or engagement value is for the Loupe system art imagery stream. This dynamically calculated higher stickiness value (S) also may equate to a higher return frequency value for MAUs who are using the Loupe system viewer application to view one or more art imagery streams or channels. Each channel has an $S_{ave}$ stickiness value for the current parameter settings for the particular channel. The Loupe system may analyze stickiness by determining for which sets of attributes for a particular channel that $S > S_{ave}$ is true 706.

The Loupe system may interrogate the attributes of channels that have the greatest or highest stickiness parameter values and utilize these attributes to increase the stickiness value for other channels by replicating those high stickiness parameter attributes to the other channels. This replication is performed by replacing the parameter attributes for a channel whenever the calculated dynamic $S > S_{ave}$ for a particular channel 708 is true. If the $S > S_{ave}$ determination is false, the parameter attributes for a particular channel are retained as unchanged 710.

The recommendation engine is optimized to increase viewing time through multiple factors herein described and continues to optimize the experience and increase the "stickiness" of the presented art imagery as the Loupe system gathers more interaction data from a user over time 712.

Figure 8:
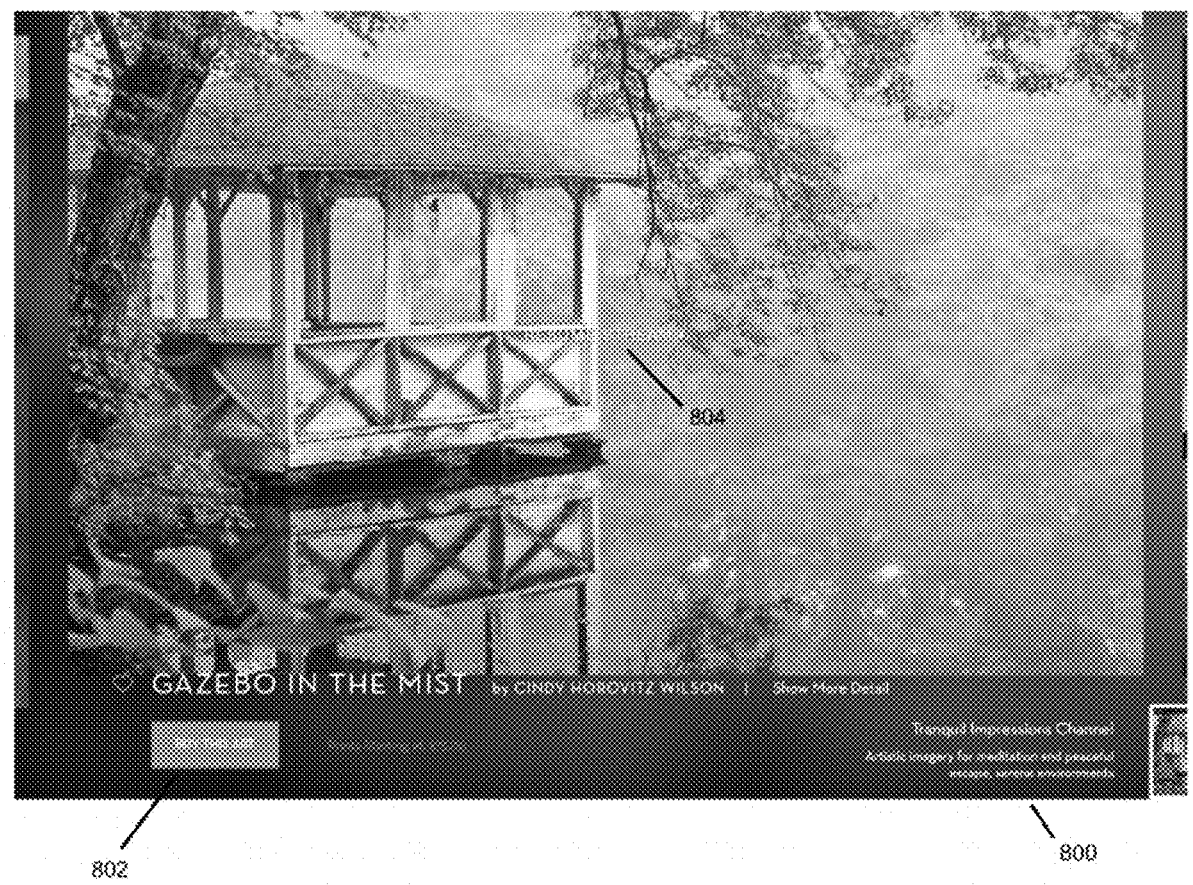
FIG. 8 is a view of the Loupe system pause and purchase capability consistent with certain embodiments of the present invention.

Turning now to FIG. 8, this figure presents a view of the Loupe system pause and purchase capability consistent with certain embodiments of the present invention. Users of the Loupe system are presented with a streamed set of selected art imagery. At 800, the Loupe system presents each user with the ability to click into the stream and pause it to make a purchase through the integrated marketplace. At 802, the user is presented with a BUY button prominently displayed outside of the image display area that permits the user to click on the BUY button, once the stream experience is paused, to purchase a copy of the art image or, where original art is available by permission of the artist or artist's representation, the original art piece. Whether the user indicates a purchase by clicking the BUY button or decides against a purchase at that time, the user may select the RESUME STREAM 804 text field superimposed on the art imagery to resume streaming art imagery on the display device. The Pause, BUY, and RESUME STREAM steps illustrate the seamless marketplace integration with an art streaming experience of the Loupe display system.

While certain illustrative embodiments have been described, it is evident that many alternatives, modifications, permutations and variations will become apparent to those skilled in the art in light of the foregoing description.

The invention claimed is:

1. A system for enabling art image characterization and display, the system comprising at least one processor and at least one memory including program code, the at least one memory and the program code configured to, with the at least one processor, cause the system to at least:

provide art imagery to a user of a client application, wherein the client application is configured to display the art imagery to the user, collect user interaction metadata regarding user interaction with the art imagery, and provide the user interaction metadata to the system;

generate a set of attributes for one or more art images;

score, based at least in part on the user interaction metadata, the set of attributes to generate a priority subset of the set of attributes for each of the one or more art images;

generate an attribute taxonomy for each art image based at least in part on the priority subset for the art image, wherein each attribute taxonomy is generated by combining the user interaction metadata with attribute data associated with the priority subset;

store each attribute taxonomy as part of a neural network training dataset for a neural network, wherein the neural network is configured to recognize similarities across input art images;

train the neural network to recognize that a particular art image of the one or more art images is similar to a previously analyzed art image when the attribute taxonomy for the particular art image is within a predetermined similarity envelope of the attribute taxonomy for the previously analyzed art image; and provide a selected subset of the one or more art images that are recognized by the neural network to be similar to the previously analyzed art image to the client application, wherein the client application is configured to display the selected subset to the user and to enable the user to interact with the selected subset.

2. The system of claim 1, wherein:

scoring the set of attributes comprises determining an attribute weight for each attribute based at least in part on an overall affinity score for each art image as determined based at least in part on user affinity data provided by the client application, and the user affinity data is determined based at least in part on user responses to the one or more art images as recorded during a session in which the one or more art images are presented to the user.

3. The system of claim 1, wherein the at least one memory and the program code are further configured to, with the at least one processor, cause the system to at least:

collect inferred nonlinear metadata and active metadata during a session in which the one or more art images are presented to the user.

4. The system of claim 1, wherein the neural network comprises one or more deep learning algorithms that are configured to classify input art images.

5. The system of claim 4, wherein the neural network is trained using target classifications determined based at least in part on data provided by one or more human curators.

6. The system of claim 1, wherein presenting the selected subset comprises presenting the selected subset using a presentation stream.

7. The system of claim 1, wherein the at least one memory and the program code are further configured to, with the at least one processor, cause the system to at least:

determine a second selected subset of the one or more art images based at least in part on a color taxonomy for each art image.

8. The system of claim 7, wherein the at least one memory and the program code are further configured to, with the at least one processor, cause the system to at least:

provide the second selected subset to the client application, wherein the client application is configured to display the second selected subset to the user and to enable the user to interact with the second selected subset.

9. The system of claim 1, wherein scoring each attribute is performed based at least in part on at least one of a viewing time or a viewing venue.

10. A computer-implemented method for enabling art image characterization and display, the computer-implemented method comprising:

providing, using one or more processors, art imagery to a user of a client application, wherein the client application is configured to display the art imagery to the user, collect user interaction metadata regarding user interaction with the art imagery, and provide the user interaction metadata to a system;

generating, using the one or more processors, a set of attributes for one or more art images;

scoring, using the one or more processors and based at least in part on the user interaction metadata, the set of attributes to generate a priority subset of the set of attributes for each of the one or more art images;

generating, using the one or more processors, an attribute taxonomy for each art image based at least in part on the priority subset for the art image;

storing, using the one or more processors, each attribute taxonomy as part of a neural network training dataset for a neural network, wherein the neural network is configured to recognize similarities across input art images, wherein each attribute taxonomy is generated by combining the user interaction metadata with attribute data associated with the priority subset;

training, using the one or more processors, the neural network to recognize that a particular art image of the one or more art images is similar to a previously analyzed art image when the attribute taxonomy for the particular art image is within a pre-determined similarity envelope of the attribute taxonomy for the previously analyzed art image; and providing, using the one or more processors, a selected subset of the one or more art images that are recognized by the neural network to be similar to the previously analyzed art image to the client application, wherein the client application is configured to display the selected subset to the user and to enable the user to interact with the selected subset.

11. The computer-implemented method of claim 10, wherein:

scoring the set of attributes comprises determining an attribute weight for each attribute based at least in part on an overall affinity score for each art image as determined based at least in part on user affinity data provided by the client application, and the user affinity data is determined based at least in part on user responses to the one or more art images as recorded during a session in which the one or more art images are presented to the user.

12. The computer-implemented method of claim 10, further comprising:

collecting, using the one or more processors, inferred nonlinear metadata and active metadata during a session in which the one or more art images are presented to the user.

13. The computer-implemented method of claim 10, wherein the neural network comprises one or more deep learning algorithms that are configured to classify input art images.

14. The computer-implemented method of claim 13, wherein the neural network is trained using target classifications determined based at least in part on data provided by one or more human curators.

15. The computer-implemented method of claim 10, wherein presenting the selected subset comprises presenting the selected subset using a presentation stream.

16. The computer-implemented method of claim 10, further comprising:

determining, using the one or more processors, a second selected subset of the one or more art images based at least in part on a color taxonomy for each art image.

17. The computer-implemented method of claim 16, further comprising:

providing, using the one or more processors, the second selected subset to the client application, wherein the client application is configured to display the second selected subset to the user and to enable the user to interact with the second selected subset.

18. A computer program product for enabling art image characterization and display, the computer program product comprising at least one non-transitory computer-readable storage medium having computer-readable program code portions stored therein, the computer-readable program code portions, when executed by at least one processor, configured to:

provide art imagery to a user of a client application, wherein the client application is configured to display the art imagery to the user, collect user interaction metadata regarding user interaction with the art imagery, and provide the user interaction metadata to a system;

generate a set of attributes for one or more art images;

score, based at least in part on the user interaction metadata, the set of attributes to generate a priority subset of the set of attributes for each of the one or more art images;

generate an attribute taxonomy for each art image based at least in part on the priority subset for the art image, wherein each attribute taxonomy is generated by combining the user interaction metadata with attribute data associated with the priority subset;

store each attribute taxonomy as part of a neural network training dataset for a neural network, wherein the neural network is configured to recognize similarities across input art images;

train the neural network to recognize that a particular art image of the one or more art images is similar to a previously analyzed art image when the attribute taxonomy for the particular art image is within a predetermined similarity envelope of the attribute taxonomy for the previously analyzed art image; and provide a selected subset of the one or more art images that are recognized to be similar by the neural network to the previously analyzed art image to the client application, wherein the client application is configured to display the selected subset to the user and to enable the user to interact with the selected subset.

* * * * *